United States Patent
Popek et al.

(10) Patent No.: US 11,201,539 B2
(45) Date of Patent: Dec. 14, 2021

(54) DC LINK CAPACITOR PRE-CHARGE METHOD UTILIZING SERIES BOOST CONVERTER

(71) Applicant: Hamilton Sundstrand Corporation, Charlotte, NC (US)

(72) Inventors: Grzegorz Popek, Birmingham (GB); Stephen Minshull, Bromsgrove (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/706,354

(22) Filed: Dec. 6, 2019

(65) Prior Publication Data
US 2021/0044211 A1 Feb. 11, 2021

(30) Foreign Application Priority Data
Aug. 5, 2019 (EP) .................... 19275087

(51) Int. Cl.
*H02M 1/36* (2007.01)
*H02M 5/44* (2006.01)
*H02M 1/00* (2006.01)

(52) U.S. Cl.
CPC ............ *H02M 1/36* (2013.01); *H02M 1/0064* (2021.05); *H02M 5/44* (2013.01)

(58) Field of Classification Search
CPC .................. H02M 1/36; H02M 1/44
See application file for complete search history.

(56) References Cited

U.S. PATENT DOCUMENTS

| 7,965,529 | B2 | 6/2011 | Gibbs et al. |
| 2003/0002298 | A1 | 1/2003 | Hussein et al. |
| 2009/0161389 | A1* | 6/2009 | Chen ............ H02M 1/36 363/16 |
| 2018/0254628 | A1 | 9/2018 | Schelenz et al. |
| 2018/0331569 | A1 | 11/2018 | Pecorari et al. |
| 2019/0157982 | A1 | 5/2019 | Brueckner et al. |

FOREIGN PATENT DOCUMENTS

| JP | 5120550 B2 * | 1/2013 |
| WO | 2019021128 A1 | 1/2019 |

OTHER PUBLICATIONS

European Search Report for Application No. 19275087.5, dated Feb. 4, 2020, 10 pages.

* cited by examiner

*Primary Examiner* — Peter M Novak
(74) *Attorney, Agent, or Firm* — Cantor Colburn LLP

(57) ABSTRACT

A power train is described herein comprising a load, a first power supply for providing power to the load, a DC-link capacitor connected to the load, a main converter configured to convert DC power to AC power for powering the load; and pre-charge circuitry. The pre-charge circuitry comprises pre-charge means configured to, during a first, pre-charge phase, prevent said power from being provided to said load but provide power to said DC-link capacitor to charge said DC-link capacitor, and, further configured to, during a second, post-charge phase, allow said power to be provided from said first power supply to said load. A method for providing power to the load is also described herein.

7 Claims, 4 Drawing Sheets

DC LINK CAPACITOR PRE-CHARGE METHOD UTILIZING SERIES BOOST CONVERTER

FOREIGN PRIORITY

This application claims priority to European Patent Application No. 19275087.5 filed Aug. 5, 2019, the entire contents of which is incorporated herein by reference.

FIELD

The examples described herein relate to the field of power conversion.

BACKGROUND

The vast majority of power conversion circuits and motor drive controllers are formed with voltage-source converters with large energy storage capacitors decoupling the power input and the converter output. When these circuits connect to a power source, a large in-rush current flows into the capacitor.

Large inrush current can damage to circuits and cause protective circuit breakers to open. Further, many known solutions typically use a resistor to limit the inrush current, and a parallel shorting switch to short the resistor for normal operation. However, such switches can result in large power losses during normal use.

It would therefore be desirable to limit the inrush current to controlled levels, whilst reducing power losses during normal operation.

SUMMARY OF THE INVENTION

A power train is described herein comprising a load, a first power supply for providing power to the load; a DC-link capacitor connected to the load; a main converter configured to convert DC power to AC power for powering the load; and pre-charge circuitry comprising pre-charge means configured to, during a first, pre-charge phase, prevent said power from being provided to said load but provide power to said DC-link capacitor to charge said DC-link capacitor, and, further configured to, during a second, post-charge phase, allow said power to be provided from said first power supply to said load.

In any of the examples described herein, the DC-link capacitor may be connected in parallel with the load.

In any of the examples described herein, the power train may further comprise a rectifier unit configured to convert AC power from the first power supply to DC power; and a main converter configured to convert DC power to AC power for powering the load. The DC link Capacitor may be connected between said rectifier unit and the main converter to facilitate proper commutation (switching) in the main converter and/or de-couple the main converter from the rectifier.

In any of the examples described herein, the converter may be configured to facilitate and/or control the power into load. This power can be of a DC or AC nature. In the case of AC, power can be supplied to the load by a single or any polyphase system.

In any of the examples described herein, the pre-charge circuitry may further comprise a power converter, a second power supply and said pre-charge means may comprise a transformer.

In any of the examples described herein, the transformer may comprise an inductor connected in series with the first power supply and the DC-link capacitor.

In any of the examples described herein, the inductor may comprise a primary winding of the transformer.

In any of the examples described herein, the transformer may further comprise a secondary winding electrically connected to the power converter and the power supply.

In any of the examples described herein, the power train may further comprise a rectifier unit configured to convert AC power from said first power means to DC power.

In any of the examples described herein, the power train may further comprise a diode connected in parallel with the DC-link capacitor.

A method of providing power to a load is also described herein comprising connecting a first power supply to the load, connecting a DC-link capacitor to the load and providing pre-charge circuitry. The pre-charge circuitry may comprise pre-charge means configured to, during a first, pre-charge phase, prevent said power from being provided to said load but provide power to said DC-link capacitor to charge said DC-link capacitor, and, further configured to, during a second, post-charge phase, allow said power to be provided from said first power supply to said load.

In any of the examples described herein, the step of connecting said DC-link capacitor to said load may comprise connecting said DC-link capacitor in parallel with the load.

In any of the examples described herein, the method may further comprise providing, in said pre-charge circuitry, a power converter, a second power supply and the pre-charge means may comprises a transformer.

In any of the examples described herein, the transformer may comprise an inductor and the method may further comprise connecting said inductor in series with the first power supply and the DC-link capacitor.

In any of the examples described herein, the transformer may comprise a primary winding and a secondary winding and the inductor may be the primary winding of the transformer. The secondary winding may be electrically connected to the power converter and the power supply. The method may further comprise inducing power in the inductor by providing said power to said secondary winding, wherein the induced power charges said DC-link capacitor.

In any of the examples described herein, the inductor and the DC-link capacitor may act as a filter section.

In any of the examples described herein, the step of pre-charging the DC-link capacitor may comprise charging the DC-link capacitor to a first, desired voltage level.

For example, in some examples, said first, desired voltage level may be 240 Vdc, although the examples are not limited to this.

DETAILED DESCRIPTION OF THE INVENTION

While the examples discussed herein will be described mainly with reference to their use with a power train found in an aircraft, it is envisaged that the apparatuses and methods described herein could also be utilised in other power trains, or power conversion circuits and are not limited to those found in aircraft.

Typically, DC-AC conversion circuits include inductive components for EMI filtering and power quality performance.

Figure 1:
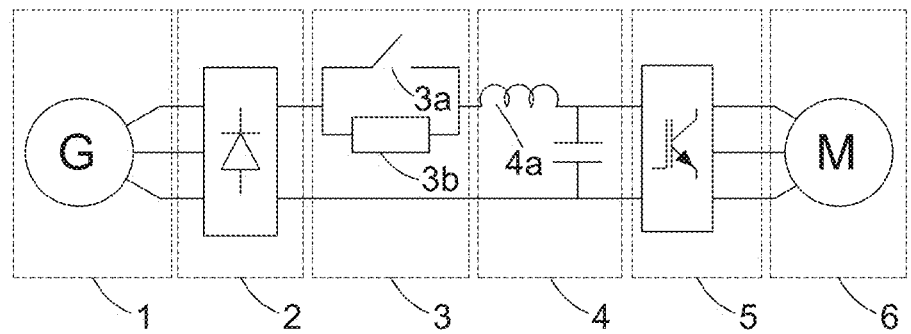
FIG. 1 shows a typical power train that may be used in aircraft.

A typical, known, power train that may be used in aircraft is presented in FIG. 1. It consists of a generator 1, a rectifier unit 2, a pre-charge circuitry 3, a filter section 4, a converter 5, and a load 6. The pre-charge functionality of the circuitry 3 is required to limit the initial in-rush current which shares capacitors in filter section 4. These limits of initial inrush current are defined by aerospace standard or individual customer requirements.

As can be seen in FIG. 1, a typical example of a known pre-charge circuitry 3 consists of a power electronics switch 3a connected in parallel with a resistor 3b. During the initial in-rush current that occurs when the 3-phase voltage from the generator 1 is applied to the power circuit, switch 3a remains open which causes the current flowing through the DC link capacitor to be limited by the resistor 3b. When the pre-charge is completed, switch 3a is closed, thereby bypassing resistor 3b. Typically thyristor or MOSFET switches are used as the switching device.

However, by utilising such a switch, some of the energy flowing from generator to the load is dissipated in the switch 3a as heat due to a conduction loss. Due to this energy loss, such systems do not support a high efficiency operation of the power train for More/All Electric Aircraft system.

Figure 2:
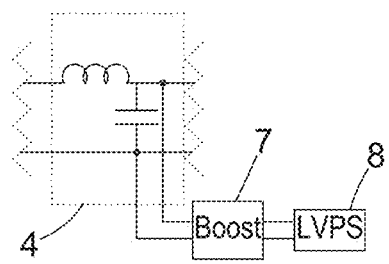
FIG. 2 shows a known use of a parallel boost converter in pre-charge circuitry.

Alternative approaches to pre-charge circuitry 3 have been considered. For example, one such approach may be seen in FIG. 2 which shows the use of a parallel boost converter. In this case, an output of the boost converter 7 is connected in parallel with the DC link capacitor, with the boost converter 7 being charged from the low voltage source 8 (for example, a battery).

Whilst utilising a boost converter, no power is dissipated in a power electronics switch during normal operation of the power train, as there is no switch. However, such circuits require the need to introduce an auxiliary inductance to support the boost operation. This inductance can be of a significant size, particularly when pre-charge phase has to be kept in hundreds or tens of microseconds time frame.

Figure 3:
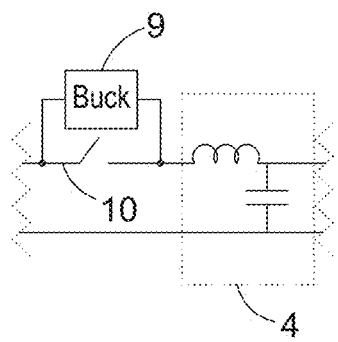
FIG. 3 shows a known use of series buck converter in pre-charge circuitry.

Another known approach requires series buck converters, as seen in FIG. 3. In this case, a buck converter 9 is connected in series with a DC link capacitor whilst the power electronics switch 10 remains open. In principle, the input voltage applied to the buck converter 9 is stepped down and then raised up to manage capacitor charging current. However, such an approach again suffers from conduction losses through the power electronics switch 10.

Figure 4:
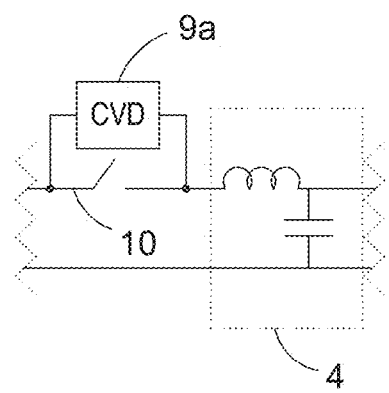
FIG. 4 shows a known use of capacitive voltage dividers in pre-charge circuitry.

Pre-charge circuits based on capacitive voltage dividers have also been utilised, as seen in FIG. 4. In principle, they are very similar to buck converter based pre-charge circuits, although they offer a safe power train disconnect in case of a fault. As can be seen in FIG. 4, capacitive voltage dividers 9a are connected in series with DC link capacitor and bypassed with power electronics switch 10 when the pre-charge phase is finished. However, these again suffer from an efficiency loss due power electronic switch 10 caused by conduction losses.

As described above, some existing solutions typically use a resistor to limit the inrush current and a parallel shorting switch (thyristor or MOSFET). Following the pre-charge operation, the shorting switch is turned on, shorting the resistor for normal operation. In contrast to this, the new types of devices and methods described herein eliminate the power losses of the parallel switch, thereby improving circuit efficiency and reducing heat sink mass. They also make use of existing magnetic components for reduced complexity.

The new examples described herein modify this existing inductive element with a secondary winding to form a transformer. The primary winding is connected as in known devices so that in normal operation the inductor performs its primary filtering function. The secondary winding is connected to a small power converter that can be operated from an auxiliary supply.

At start-up, the secondary winding is excited with the small power converter to gradually charge the DC link capacitor. Once charged, the small converter is disabled, high voltage can be connected to the main circuit and normal operation commences, preventing a damaging inrush current.

A new type of device that is capable of providing improved pre-charge operation and more efficient steady state operation is described below and shown in FIG. 5. As can be seen in this figure, a power train may be provided comprising a generator 1, a rectifier unit 2, pre-charge circuitry 11, a converter 5, and a load 6. Pre-charge circuitry 11 may comprise a transformer 12 (comprising a primary winding 121 and a secondary winding 122), a power converter 13 and a power supply 14. Further, in some examples, the pre-charge circuitry 11 may optionally comprise a diode 15, if the power train is powered from a DC source.

As can be seen in this figure, the primary winding 121 of transformer 12 is connected in series with the power supply and the DC link capacitor 111. After pre-charge, this primary winding 121 is visible to the power train as an inductance, and thereby assures compliance with power quality requirements. In this manner, the series connection of primary winding 121 and DC link capacitor 111 may act as a filter section.

The secondary winding 122 is connected to the power converter 13 and is powered from the power supply 14. During the pre-charge phase, the power converter 13 induces flux in the transformer 12 such that the EMF primary winding 121 closes the pre-charge circuit via DC link capacitor 111 and diode 15. In this way, the current flowing through the pre-charge circuit 11 charges the DC link capacitor 111.

The DC link capacitor 111 may comprise a plurality of conductors connected in parallel, and/or a plurality of capacitors connected in series. A plurality of capacitors in series may be utilised when a multilevel converter 5 is used.

By way of example, when a six pulse rectifier unit 2 is used, the pre-charge circuit may be closed by rectifier unit 2, or in the case of a DC fed power train, the pre-charge circuit via a dedicated diode 15.

Advantageously, pre-charge circuit 11 does not require extra magnetic components. In this way, an existing DC link inductor may be utilised as a primary winding 121 for the transformer 12. Further, the pre-charge circuit 11 does not require the use of a power electronic switch. In addition to this, one of the sources of conduction loss in a typical power train is removed, thereby improving efficiency.

Figure 5:
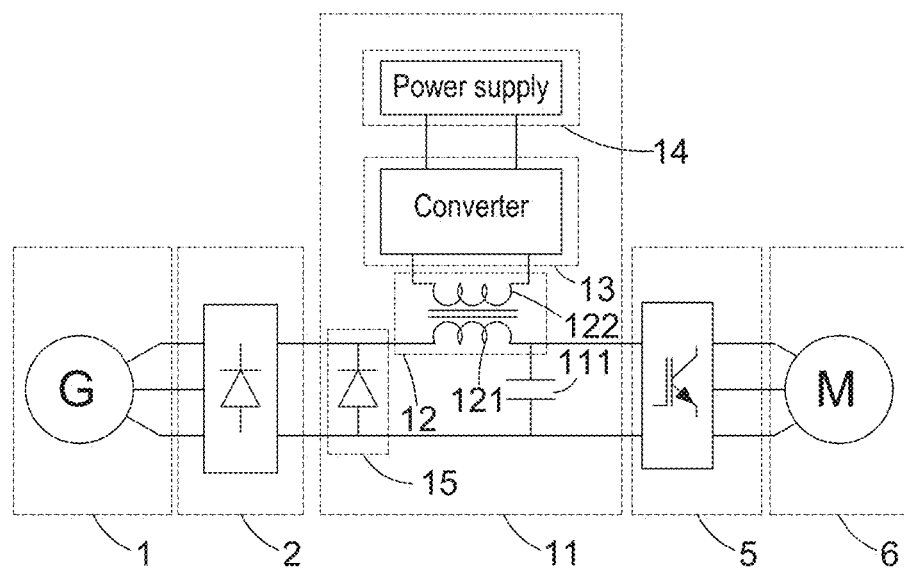
FIG. 5 shows a circuit providing improved pre-charge operation and more efficient steady state operation according to the new examples described herein.
Figure 6:
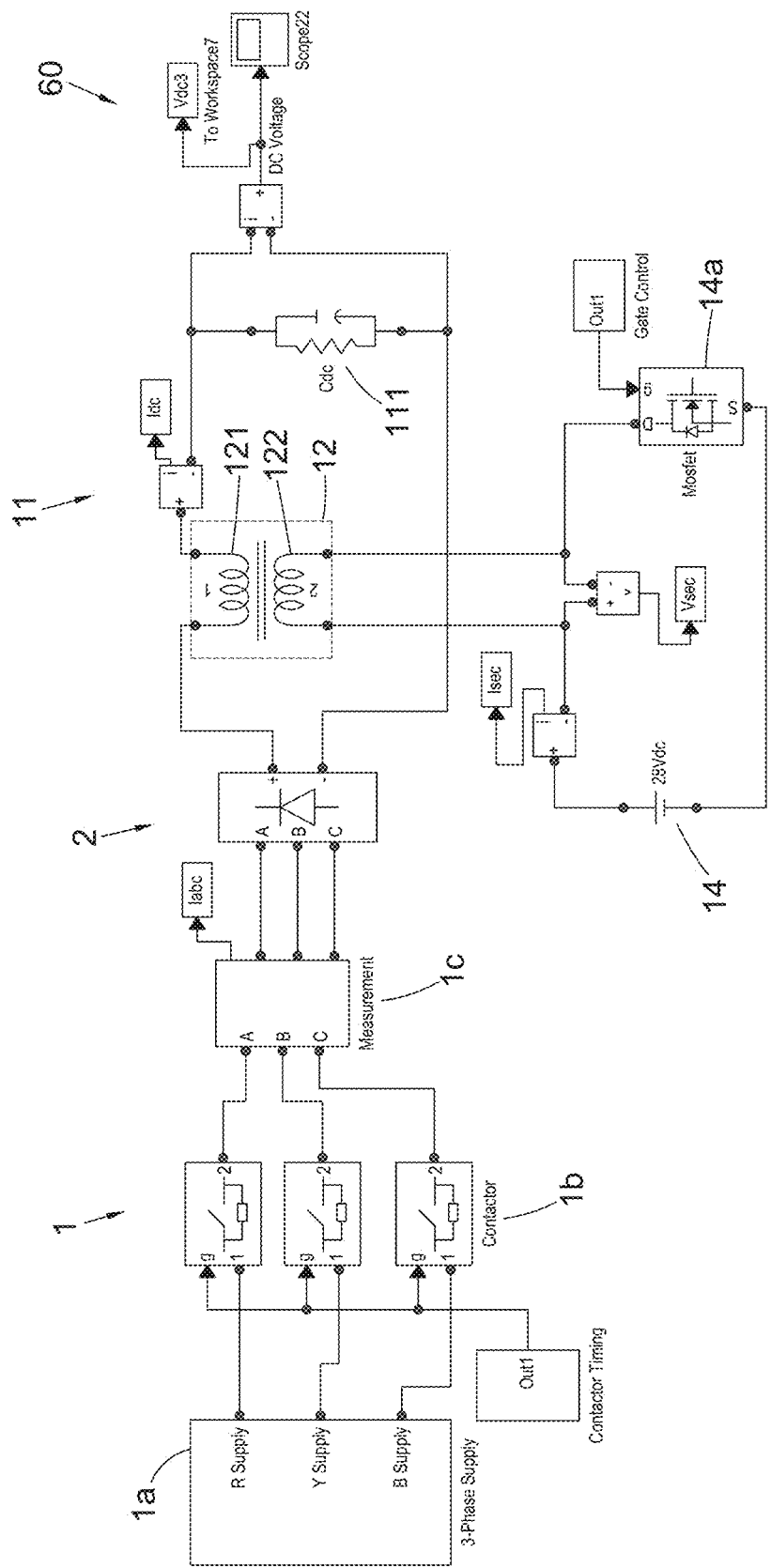
FIG. 6 shows a simulated model of the power train of FIG. 5.

FIG. 6 shows a model of the power train of FIG. 5 for simulation to show the benefits of the new type of pre-charge circuit 11. The model includes a 3-phase power supply 1*a*, 3-phase contactors 1*b*, input current measurement 1*c*, 6-pulse rectifier 2, and a model of pre-charge circuit 11 with DC-link inductor 12 with the pre-charge winding 121, DC-link capacitance 111 and a power supply circuit 14 to drive the secondary pre-charge winding 122 of the DC-link inductor 12. The contactors 1*b* are present in the model to simulate the in-rush situation where the 3-phase voltages are suddenly applied to the power circuit. In the simulation, the voltage across the DC-link capacitor is measured at oscilloscope 60.

Figure 7:
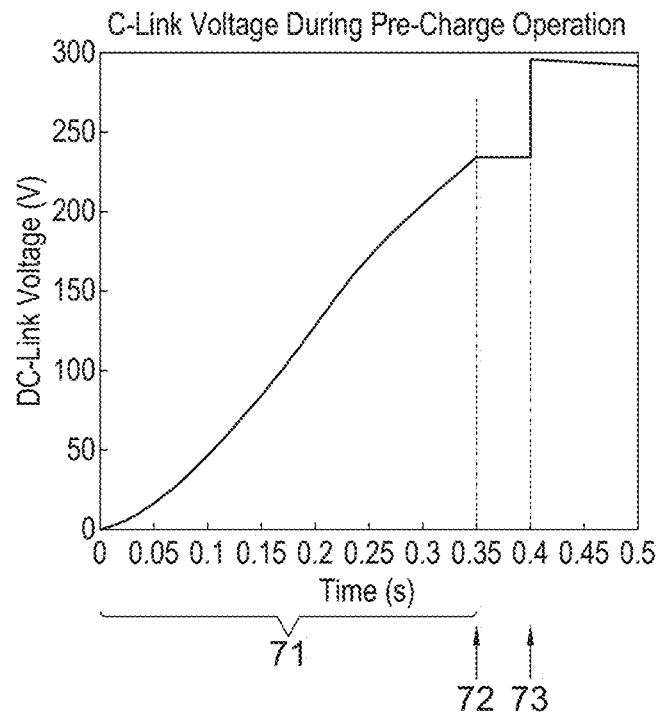
FIG. 7 shows the pre-charge operation of the model of FIG. 6.

FIG. 7 demonstrates the pre-charge operation by showing the measurement of the DC-link voltage measured across the DC-Link capacitor 111 over time. Initially, the AC power supply 1*a* is disconnected via the contactors 1*b* and the DC-link capacitor 111 is gradually charged in a pre-charge operation over time period 71 via the power supply 14 and coupled DC-link inductor 122. At time 72 (for example, 0.35 s) the DC-link capacitor 111 is almost fully charged to the anticipated level, for example the anticipated level may be 270V. At this point, point 72, the power supply 14 is disabled and the DC-link voltage across capacitor 111 stabilises. At point 73, for example when time=0.4 s after pre-charge has begun, the 3-phase contactors may be closed, thereby connecting the main power supply 1 to the DC-link. The system is then ready for full power operation.

If there is a disparity between the level to which the DC-link capacitor 111 has been charged, and the voltage supplied by the main power supply 1, there may be a secondary in-rush event at the instant when the contactors are closed, i.e. time 73 (for example, when time=0.4 s) since the DC-link capacitor 111 has not reached the final value of charge. In the example of FIG. 7, DC-link capacitor is pre-charged to around 240 Vdc, whilst the main power supply is provided at 270V. Therefore, when the main power supply 1 is connected in the example of FIG. 7, then a secondary in-rush charges the DC-link capacitor from 240V to 270V almost instantaneously. Such a secondary in-rush at time 73 may also be seen with traditional pre-charge schemes and hence does not cause any adverse effects or power quality non-compliances.

Figure 8:
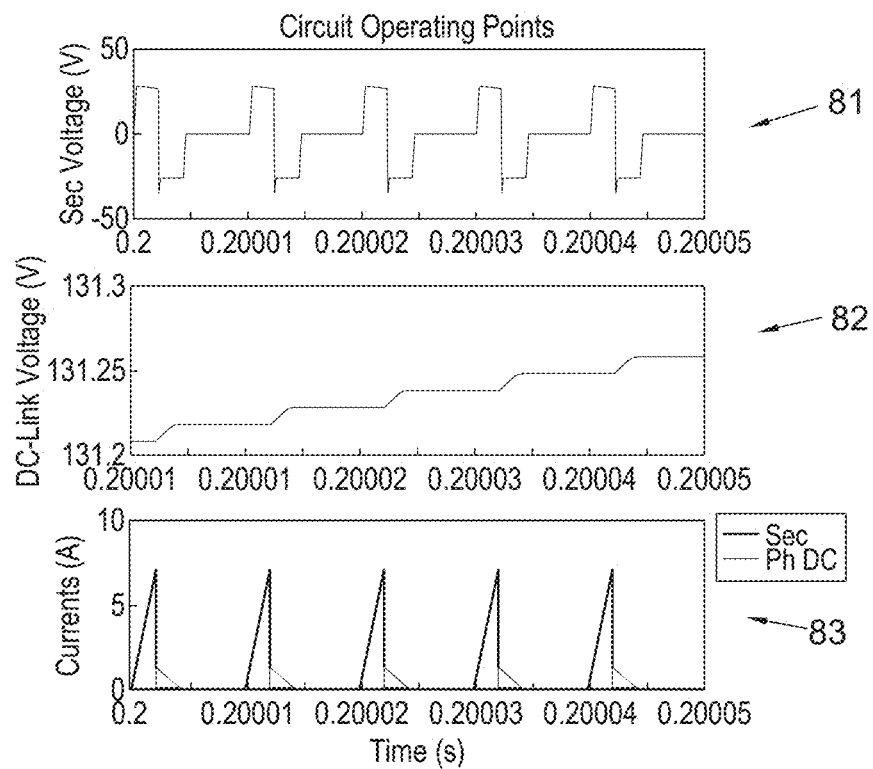
FIG. 8 shows more details of the pre-charge operation shown in FIG. 7.

More simulation details are shown in FIG. 8 where the time-axis is expanded during the pre-charge operation 71. Graph 81 shows the voltage measured across the secondary pre-charge winding 122. Each pulse demonstrates the cycle-by-cycle operation of the switching power supply that drives the pre-charge secondary winding 122. Graph 82 shows the DC-link voltage across the DC-link capacitor 111, which shows the voltage increasing by small amounts for each switching event. Finally, Graph 83 shows the current in the secondary pre-charge winding 122 and the current in the primary DC-link circuit 11. In this simulation, the power supply 14 together with controlled switch 14*a* behaves as a fly-back circuit where energy is stored in the secondary pre-charge winding 122 during the on-period of the power supply MOSFET 14*a* and is transferred to the DC-link capacitor 111 via the primary winding 121 when the MOSFET 14*a* is turned off.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

What is claimed is:

1. A power train, the power train comprising:
a load;
a first power supply for providing power to the load;
a DC-link capacitor connected to the load;
a main converter configured to convert DC power to AC power for powering the load; and
pre-charge circuitry comprising;
    a transformer configured to, during a first, pre-charge phase, prevent said power from being provided to said load but provide said power to said DC-link capacitor to store a first energy in said DC-link capacitor, and, further configured to, during a second, post-charge phase, allow said first energy to be provided from said first power supply to said load;
    a power converter; and
    a second power supply; and
a rectifier unit configured to convert AC power from the first power supply to DC power;
wherein said DC link capacitor is connected between the rectifier unit and the main converter;
wherein said transformer comprises an inductor connected in series with the first power supply and the DC-link capacitor such that the series connection of primary winding and DC link capacitor acts as a filter section on the power train;
wherein said inductor comprises a primary winding of said transformer;
wherein said transformer further comprises a secondary winding electrically connected to the power converter and the second power supply.

2. The power train of claim 1, wherein the DC link capacitor comprises a plurality of capacitors connected in parallel to each other and/or a plurality of capacitors connected in series.

3. The power train of claim 1, further comprising a diode connected in parallel with the DC-link capacitor.

4. A method of providing power to a load comprising:
connecting a first power supply to the load;
connecting a DC-link capacitor to a main converter;
connecting the main converter to the load; and
providing pre-charge circuitry comprising:
    a transformer configured to, during a first, pre-charge phase, prevent said power from being provided to said load but provide said power to said DC-link capacitor to store a first energy in said DC-link capacitor, and, further configured to, during a second, post-charge phase, allow said first energy to be provided from said first power supply to said load;
    a power converter; and
    a second power supply; and
providing a rectifier unit configured to convert AC power from the first power supply to DC power, wherein said step of connecting said DC-link capacitor to said load comprises connecting said DC-link capacitor to the rectifier unit and connecting the converter to the load;
wherein said transformer comprises:
an inductor and the method further comprises connecting said inductor in series with the first power supply and the DC-link capacitor such that the series connection of primary winding and DC link capacitor acts as a filter section on the power train, wherein said inductor comprises a primary winding of said transformer; and
a secondary winding electrically connected to the power converter and the second power supply.

5. The method of claim 4, further comprising:
inducing power in the inductor by providing said power to said secondary winding, wherein the induced power charges said DC-link capacitor.

6. The method of claim 4, wherein the inductor and the DC-link capacitor act as a filter section.

7. The method of claim 4, wherein the step of pre-charging the DC-link capacitor comprises:
charging the DC-link capacitor to a first voltage level.

* * * * *